United States Patent
Washnock

(10) Patent No.: US 12,179,856 B2
(45) Date of Patent: Dec. 31, 2024

(54) METHODS AND APPARATUS TO DETERMINE LOADS ENCOUNTERED BY A STEERING RACK

(71) Applicant: Ford Global Technologies, LLC, Dearborn, MI (US)

(72) Inventor: Joseph Washnock, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/518,144

(22) Filed: Nov. 22, 2023

(65) Prior Publication Data

US 2024/0083494 A1  Mar. 14, 2024

Related U.S. Application Data

(63) Continuation of application No. 17/207,168, filed on Mar. 19, 2021, now Pat. No. 11,866,106.

(51) Int. Cl.
*B62D 5/04* (2006.01)
*B62D 3/12* (2006.01)
(Continued)

(52) U.S. Cl.
CPC .......... *B62D 5/0481* (2013.01); *B62D 3/126* (2013.01); *B62D 5/0406* (2013.01);
(Continued)

(58) Field of Classification Search
None
See application file for complete search history.

(56) References Cited

U.S. PATENT DOCUMENTS 2,855,791 A  10/1958  Hogan
4,593,780 A   6/1986  Saito
(Continued)

FOREIGN PATENT DOCUMENTS

CN       2710999 Y    7/2005
CN     103465797 A   12/2013
(Continued)

OTHER PUBLICATIONS

United States Patent and Trademark Office, "Non-Final Office Action," issued in connection with U.S. Appl. No. 15/985,310, dated Jan. 8, 2020, 10 pages.
(Continued)

*Primary Examiner* — Kevin R Steckbauer
(74) *Attorney, Agent, or Firm* — Lorne Forsythe; Hanley, Flight & Zimmerman, LLC

(57) ABSTRACT

Methods and apparatus to determine rack force are disclosed. An example apparatus includes a rack to couple to a steering knuckle of a vehicle, a ball nut engaged with the rack, a first ring gear coupled to the ball nut, a first pinion fixed to a motor, the first pinion engaged with the first ring gear, the motor to rotate the ball nut to move the rack, a motor encoder to detect a rotation of the first pinion, a second ring gear coupled to the ball nut, and a sensor fixed to a second pinion, the second pinion engaged with the second ring gear, the second pinion to rotate as the second ring gear rotates, the sensor to detect a rotation of the second pinion, the rotation of the second pinion and the rotation of the first pinion corresponding to a force on the rack.

20 Claims, 7 Drawing Sheets

(51) Int. Cl.
  *B62D 6/00*   (2006.01)
  *B62D 6/04*   (2006.01)
(52) U.S. Cl.
  CPC ......... *B62D 5/0427* (2013.01); *B62D 5/0448* (2013.01); *B62D 6/008* (2013.01); *B62D 6/04* (2013.01)

(56) References Cited

U.S. PATENT DOCUMENTS

| | | | | |
|---|---|---|---|---|
| 4,676,331 | A * | 6/1987 | Iwaki | B62D 6/10 |
| | | | | 180/443 |
| 4,724,711 | A * | 2/1988 | Sakakibara | G01L 3/1457 |
| | | | | 180/444 |
| 4,724,917 | A * | 2/1988 | Naito | B62D 5/0436 |
| | | | | 180/404 |
| 4,862,982 | A * | 9/1989 | Saito | B62D 6/10 |
| | | | | 180/443 |
| 5,284,219 | A | 2/1994 | Shimizu et al. | |
| 7,841,443 | B2 * | 11/2010 | Mizuno | B62D 5/0463 |
| | | | | 180/443 |
| 8,245,813 | B2 * | 8/2012 | Mizuno | B62D 3/123 |
| | | | | 180/444 |
| 8,364,347 | B2 | 1/2013 | Tsukasaki et al. | |
| 8,862,325 | B2 * | 10/2014 | Soos | B62D 15/0235 |
| | | | | 701/41 |
| 9,174,673 | B2 * | 11/2015 | Strecker | B62D 6/04 |
| 9,694,847 | B2 * | 7/2017 | Yoshida | G01L 5/221 |
| 9,828,021 | B2 * | 11/2017 | Ueno | B62D 5/0481 |
| 10,053,143 | B2 * | 8/2018 | Wang | B62D 6/04 |
| 10,059,368 | B2 * | 8/2018 | Sakaguchi | B62D 6/08 |
| 10,112,642 | B2 * | 10/2018 | Ko | B62D 15/024 |
| 10,814,904 | B2 * | 10/2020 | Washnock | B62D 7/18 |
| 10,962,429 | B2 * | 3/2021 | Hwang | B62D 6/008 |
| 11,052,940 | B1 * | 7/2021 | Narasimhan | B62D 3/126 |
| 11,423,711 | B2 * | 8/2022 | Frankovics | G07C 5/0808 |
| 11,465,675 | B2 * | 10/2022 | Narasimhan | B62D 3/126 |
| 11,479,293 | B2 * | 10/2022 | Narasimhan | B62D 5/006 |
| 11,492,039 | B2 * | 11/2022 | Narasimhan | B62D 6/002 |
| 11,492,040 | B2 * | 11/2022 | Narasimhan | B62D 5/006 |
| 11,597,427 | B2 | 3/2023 | Washnock et al. | |
| 11,608,106 | B2 * | 3/2023 | Nakamura | B62D 5/0445 |
| 11,613,238 | B2 * | 3/2023 | Dodak | B60T 13/746 |
| | | | | 180/444 |
| 11,738,800 | B2 * | 8/2023 | Narasimhan | B62D 3/126 |
| | | | | 701/41 |
| 11,814,117 | B2 * | 11/2023 | Narasimhan | B62D 3/126 |
| 11,834,110 | B2 * | 12/2023 | Narasimhan | B62D 5/0484 |
| 11,866,106 | B2 * | 1/2024 | Washnock | B62D 3/126 |
| 11,919,580 | B2 * | 3/2024 | Yang | B62D 15/027 |
| 12,054,204 | B2 * | 8/2024 | Ramanujam | B62D 5/0409 |
| 2007/0089926 | A1 | 4/2007 | Jo et al. | |
| 2008/0042389 | A1 * | 2/2008 | Mizuno | B62D 5/0463 |
| | | | | 280/93.514 |
| 2011/0040448 | A1 * | 2/2011 | Mizuno | B62D 3/123 |
| | | | | 701/41 |
| 2012/0241244 | A1 | 9/2012 | Escobedo et al. | |
| 2013/0030653 | A1 * | 1/2013 | Soos | B62D 15/0235 |
| | | | | 701/41 |
| 2014/0353068 | A1 | 12/2014 | Yamamoto | |
| 2014/0353070 | A1 | 12/2014 | Tsukagoshi | |
| 2015/0307126 | A1 * | 10/2015 | Yoshida | G01L 5/221 |
| | | | | 74/492 |
| 2016/0280253 | A1 * | 9/2016 | Ueno | B62D 3/12 |
| 2017/0096161 | A1 * | 4/2017 | Ko | B62D 15/024 |
| 2018/0127021 | A1 * | 5/2018 | Wang | B62D 6/10 |
| 2019/0113404 | A1 | 4/2019 | Toyama | |
| 2019/0113405 | A1 | 4/2019 | Yuichi | |
| 2019/0351932 | A1 * | 11/2019 | Washnock | B62D 5/0454 |
| 2019/0355187 | A1 * | 11/2019 | Frankovics | B62D 5/0481 |
| 2020/0088596 | A1 * | 3/2020 | Hwang | B62D 6/008 |
| 2020/0130739 | A1 * | 4/2020 | Kodera | B62D 6/008 |
| 2020/0156702 | A1 * | 5/2020 | Dodak | G01D 5/145 |
| 2020/0361523 | A1 * | 11/2020 | Nakamura | B62D 15/0235 |
| 2020/0398889 | A1 * | 12/2020 | Higashi | B62D 3/126 |
| 2021/0171090 | A1 | 6/2021 | Raither | |
| 2021/0403085 | A1 * | 12/2021 | Hong | B62D 6/008 |
| 2022/0089211 | A1 * | 3/2022 | Naik | H02P 6/17 |
| 2022/0289277 | A1 * | 9/2022 | Narasimhan | B62D 5/001 |
| 2022/0289278 | A1 * | 9/2022 | Narasimhan | B62D 5/0484 |
| 2022/0289279 | A1 * | 9/2022 | Narasimhan | B62D 6/002 |
| 2022/0289280 | A1 * | 9/2022 | Narasimhan | B62D 5/0484 |
| 2022/0289281 | A1 * | 9/2022 | Narasimhan | B62D 5/001 |
| 2022/0289282 | A1 * | 9/2022 | Narasimhan | B62D 5/006 |
| 2022/0289283 | A1 * | 9/2022 | Narasimhan | B62D 5/006 |
| 2022/0297746 | A1 * | 9/2022 | Washnock | B62D 5/0406 |
| 2023/0182807 | A1 * | 6/2023 | Yang | B62D 15/027 |
| | | | | 701/41 |
| 2023/0391394 | A1 * | 12/2023 | Narasimhan | B62D 3/126 |
| 2024/0083494 | A1 * | 3/2024 | Washnock | B62D 5/0406 |
| 2024/0092420 | A1 * | 3/2024 | Wang | B62D 5/0412 |
| 2024/0157999 | A1 * | 5/2024 | Rose | B62D 5/0424 |

FOREIGN PATENT DOCUMENTS

| | | | | |
|---|---|---|---|---|
| CN | 104210538 A | * | 12/2014 | ......... B62D 5/0412 |
| CN | 104210539 A | * | 12/2014 | ......... B62D 5/0412 |
| CN | 105313953 A | | 2/2016 | |
| CN | 107021133 A | * | 8/2017 | ........ B62D 15/0225 |
| CN | 107399363 A | * | 11/2017 | ........ B29C 45/0046 |
| CN | 107428362 A | * | 12/2017 | ............ B62D 3/123 |
| CN | 107021133 B | * | 4/2019 | ........ B62D 15/0225 |
| CN | 109664931 A | * | 4/2019 | .............. B62D 1/16 |
| CN | 109668507 A | * | 4/2019 | ........ B62D 15/0215 |
| CN | 107428362 B | * | 7/2019 | ............ B62D 3/123 |
| CN | 112595449 A | * | 4/2021 | ............ G01L 5/243 |
| CN | 109664931 B | * | 7/2022 | .............. B62D 1/16 |
| CN | 109668507 B | * | 7/2022 | ........ B62D 15/0215 |
| CN | 112595449 B | * | 12/2022 | ............ G01L 5/243 |
| DE | 102011102453 A1 | * | 5/2012 | ......... B62D 5/0463 |
| DE | 102011102453 B4 | * | 1/2017 | ......... B62D 5/0463 |
| DE | 102018119977 A1 | | 2/2020 | |
| DE | 112019005763 T5 | * | 8/2021 | |
| DE | 102017203973 B4 | * | 5/2022 | ......... B62D 5/0469 |
| EP | 3156308 B1 | * | 3/2019 | .............. B62D 3/12 |
| JP | 2005065443 A | * | 3/2005 | ......... B62D 5/0406 |
| JP | 5483729 B2 | | 5/2014 | |
| JP | 2016182889 A | * | 10/2016 | ............ B62D 3/123 |
| JP | 6535969 B2 | * | 7/2019 | ............ B62D 3/123 |
| JP | 2019190561 A | * | 10/2019 | |
| JP | 2020020455 A | * | 2/2020 | |
| JP | 2020131806 A | * | 8/2020 | |
| JP | 2020172170 A | * | 10/2020 | |
| JP | 2021046894 A | * | 3/2021 | |
| JP | 7052529 B2 | * | 4/2022 | |
| JP | 2022104689 A | | 7/2022 | |
| JP | 7222263 B2 | * | 2/2023 | |
| KR | 101428073 B1 | | 9/2014 | |
| WO | WO-2016152694 A1 | * | 9/2016 | ............ B62D 3/123 |

OTHER PUBLICATIONS

United States Patent and Trademark Office, "Notice of Allowance and Fee(s) Due," issued in connection with U.S. Appl. No. 15/985,310, dated Jun. 24, 2020, 8 pages.

United States Patent and Trademark Office, "Notice of Allowance and Fee(s) Due" issued in connection with U.S. Appl. No. 17/079,076, dated Oct. 20, 2022, 8 pages.

United States Patent and Trademark Office, "Notice of Allowance and Fee(s) Due", issued in connection with U.S. Appl. No. 17/207,168, dated Aug. 9, 2023, 7 pages.

United States Patent and Trademark Office, "Corrected Notice of Allowability," issued in connection with U.S. Appl. No. 17/207,168, dated Nov. 30, 2023, 2 pages.

\* cited by examiner

US 12,179,856 B2

METHODS AND APPARATUS TO DETERMINE LOADS ENCOUNTERED BY A STEERING RACK

RELATED APPLICATION

This patent arises from a continuation of U.S. patent application Ser. No. 17/207,168 (now U.S. Pat. No. 11,866, 106), which was filed on Mar. 19, 2021. U.S. patent application Ser. No. 17/207,168 is hereby incorporated herein by reference in its entirety. Priority to U.S. patent application Ser. No. 17/207,168 is hereby claimed.

FIELD OF THE DISCLOSURE

This disclosure relates generally to steering actuators and, more particularly, to methods and apparatus to determine loads encountered by a steering rack.

BACKGROUND

Known vehicles typically include a mechanical linkage that connects the steering wheel to the front wheels of the vehicle and enables a driver to steer the vehicle by rotating the steering wheel. For example, many known steering systems include rack and pinion gears that translate rotational motion of a steering wheel to linear actuation or movement of one or more tie rods, which are connected to the front wheels of the vehicle. The tie rods change the angle of the front wheels, thereby turning the wheels and steering the vehicle.

In recent years, steer-by-wire systems and autonomous driving systems have been implemented in vehicles. These systems eliminate traditional mechanical linkage assemblies between the steering wheel and the wheels of the vehicle. Instead, an actuator operates to turn the wheels based on a measured rotational angle of the steering wheel and/or instructions from an autonomous driving program. The system can utilize a load encountered by a rack associated with the actuator to ensure that the orientation of the wheels corresponds to the measured rotational angle of the steering wheel or the instructions from the autonomous driving program.

SUMMARY

Example methods and apparatus to determine rack force are disclosed herein. An example apparatus includes a rack to couple to a steering knuckle of a vehicle, a ball nut engaged with the rack, a first ring gear coupled to the ball nut, a first pinion fixed to a motor, the first pinion engaged with the first ring gear, the motor to rotate the ball nut, via the first pinion and the first ring gear, to move the rack, a motor encoder to detect a rotation of the first pinion, a second ring gear coupled to the ball nut, and a sensor fixed to a second pinion, the second pinion engaged with the second ring gear, the second pinion to rotate as the second ring gear rotates, the sensor to detect a rotation of the second pinion, the rotation of the second pinion and the rotation of the first pinion corresponding to a force on the rack.

An example steering actuator includes a rack, a ball nut coupled to the rack, a motor to rotate the ball nut to translate the rack, a first sensor to detect a rotation of a shaft of the motor, a second sensor to detect a rotation of the ball nut, the second sensor separate from the motor, the rotation of the ball nut and the rotation of the shaft of the motor corresponding to a force on the rack.

An example vehicle includes a steering knuckle, a tie rod, a first end of the tie rod coupled to the steering knuckle, and an actuator including a rack, a second end of the tie rod coupled to the rack, a ball nut coupled to the rack, a first ring gear coupled to and disposed around the ball nut, a motor to drive the first ring gear to rotate the ball nut, a first sensor to detect a rotation of a shaft of the motor, a second ring gear coupled to and disposed around the ball nut, a pinion engaged with the second ring gear, and a sensor fixed to the pinion, the sensor to detect a rotation of the pinion, the rotation of the pinion and the rotation of the shaft of the motor corresponding to a force on the rack.

Figure 1:
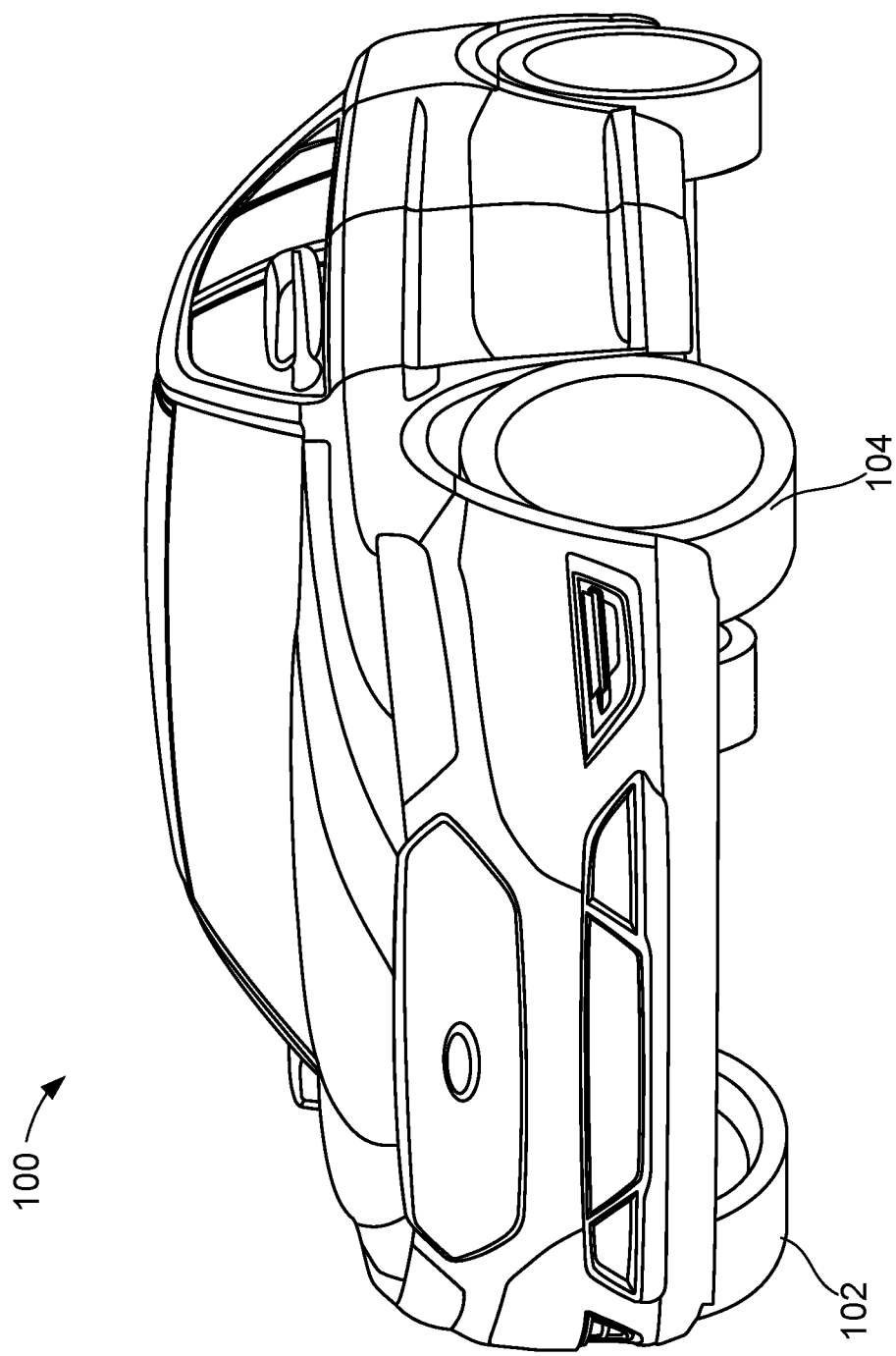
FIG. 1 illustrates an example vehicle in which the examples described herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example methods and apparatus to determine loads encountered by a steering rack that may be used for steering a vehicle, such as a steer-by-wire vehicle and/or an autonomous vehicle. Example steering actuators disclosed herein identify rack forces with an improved resolution at lower magnitudes (e.g., less than 300 Newtons (N)) compared to known steering actuators. As a result, the example steering actuators disclosed herein can control the steering of the vehicle more precisely than known steering actuators using the identified rack forces. In addition, the example steering actuators disclosed herein are smaller and, thus, require less space than some known steering actuators. Before disclosing the example actuators and related aspects in detail, a brief description of known steer-by-wire systems is provided below.

In known steer-by-wire vehicles, the steering wheel of the vehicle is not directly mechanically connected to the wheels. Instead, a sensor measures a steering wheel angle (SWA) of the steering wheel and an actuator is activated (e.g., via a controller or an electronic control unit (ECU)) to turn the wheels in one direction or the other direction based on the measured SWA. Autonomous vehicles similarly utilize steering actuators to turn the wheels to steer the vehicle.

Known steering actuators identify a force or load on a steering rack based on an output of a motor that drives the actuator. For instance, a torque sensor can be utilized to determine a rotation of a motor shaft, which is related to a force on a steering rack. Further, the ECU can determine whether a target steering angle (e.g., a target angle of the wheels of the vehicle) associated with the measured SWA, or determined in an autonomous driving mode program, is implemented based on the force on the steering rack. Accordingly, the ECU can cause the motor to adjust the steering angle in response to the target steering angle not being implemented. As such, the ECU can constantly check the force on the rack and update the output of the motor to steer the vehicle based on the implemented steering angle and the target steering angle.

However, a resolution at which known steering actuators detect rack forces is often limited as the force on the rack is determined based on a torque that indirectly drives the rack. Consequently, the torque does not account for friction encountered by components between the motor and the rack, which can affect the force on the rack, especially when the rack encounters forces at lower magnitudes (e.g., forces less than 300 N). Accordingly, in known steering actuators, the rack force identified by the ECU can differ from the actual rack force, which limits a control and/or an accuracy of the steering angle implemented by the actuator.

Disclosed herein are example steering systems that identify loads on a steering rack at magnitudes that are often not measurable by known steering systems. Further, the example steering systems disclosed herein identify the loads on the steering rack at an increased resolution compared to known steering systems. The example steering systems can be utilized in steer-by-wire and/or autonomous vehicles, for example. An example steering system disclosed herein includes a rack to couple to a steering knuckle of a vehicle and a ball nut engaged with the rack. In some examples, a first ring gear and second ring gear are coupled to the ball nut. In some examples, a geared thrust bearing coupled to and disposed around the ball nut includes the first ring gear and the second ring gear. In some examples, the first ring gear has a first diameter and the second ring gear has a second diameter less than the first diameter. In some examples, a first pinion fixed to a motor is engaged with the first ring gear. As a result, the motor can rotate the ball nut, via the first pinion and the first ring gear, to move the rack.

In some examples a motor encoder (e.g., a rotary encoder) detects a rotation of the first pinion and/or a shaft of the motor.

In some examples, the example actuator includes an anti-rotation device that is used to prevent the rack from rotating as the ball nut rotates. In particular, when rotating a nut, a rack or screw within the nut has a tendency to rotate with the nut rather than being moved linearly. To prevent this rotation, the example actuator may include an anti-rotation rod and a slide locator. The anti-rotation rod may be disposed adjacent to and extend along at least a portion of the rack. The slide locator is coupled to and extends from the rack. The slide locator is slidable along the anti-rotation rod. As the rack moves linearly, the slide locator slides along the anti-rotation rod. The interface between the anti-rotation rod and the slide locator prevents the rack from rotating. Thus, the rack can only move linearly when the ball nut is rotated.

In some examples, the steering system further includes a sensor fixed to a second pinion that is engaged with the second ring gear. Accordingly, the second pinion rotates as the second ring gear rotates. In turn, the sensor detects a rotation of the second pinion, which corresponds to a rotation of the ball nut. For example, the sensor can be a rotary encoder fixed to the second pinion to detect the rotation thereof. Although examples disclosed herein utilize a rotary encoder to detect the rotation of the ball nut, it should be understood that other sensors can alternatively be used to detect the rotation of the ball nut. For example, the sensor can be a torque sensor that measures a torque on the second pinion, which can be utilized to determine the rotation thereof and, thus, the force on the rack. Alternatively, a position sensor other than a rotary encoder, such as a Hall effect sensor(s), can be implemented to detect the rotation of the second pinion and/or the ball nut. For example, a magnet(s) can be positioned on, and rotate with, the ball nut or the second pinion. Further, a Hall effect sensor can detect a magnetic field associated with the magnet(s), which can be utilized to determine the rotation of the ball nut or the second pinion and, thus, the force on the rack.

In some examples, the steering system includes a controller (e.g., an ECU) that determines the force on the rack based on the rotation of the first pinion and the rotation of the second pinion. In some examples, the ECU determines the force on the rack based on a shape (e.g., a pitch diameter, a helix angle, etc.) of the first ring gear and the second ring gear. In some examples, the steering system includes spring washers to couple the ball nut to a housing. In such examples, the ECU determines the force on the rack based on a spring rate of the spring washers.

Advantageously, the ECU determines the force on the rack based on an axial deflection of the ball nut, which directly drives the rack, as opposed to known steering systems that determine the force on the rack based on the torque on the motor shaft that drives the ball nut. As a result, the steering system eliminates and/or otherwise reduces an effect of friction between components of the steering actuator. In some examples, the ECU controls a steering feel based on the determined force on the rack. As such, a driver of the vehicle obtains improved road and tire dynamics through the steering feel as the steering feel can correspond to rack forces of lower magnitudes (e.g., less than 300 N) that some known steering actuators are unable to detect. Further, the steering system can precisely control an orientation of the wheels of the vehicle to correspond with the measured SWA and/or the target steering angle determined in an autonomous driving mode program based on the force on the rack.

Example actuators disclosed herein may be used to independently steer the wheels of a vehicle. For example, one actuator may be associated with one wheel, and a second actuator may be associated with another wheel. The actuators operate independently to turn the wheels. In other examples, two actuators may be mechanically coupled to move the wheels in unison.

FIG. 1 illustrates an example vehicle 100 in which example actuators disclosed herein may be implemented. In the illustrated example, the vehicle 100 is depicted as a car (e.g., a sedan). However, in other examples, the vehicle 100 may be implemented as any other type of vehicle, such as a pick-up truck, a van, an all-terrain vehicle (ATV), etc. The vehicle 100 incudes a first front wheel 102 (right wheel) and a second front wheel 104 (left wheel) that may be turned or angled to steer the vehicle 100. The vehicle 100 may be a steer-by-wire vehicle and/or capable of operating in an autonomous driving mode.

Figure 2:
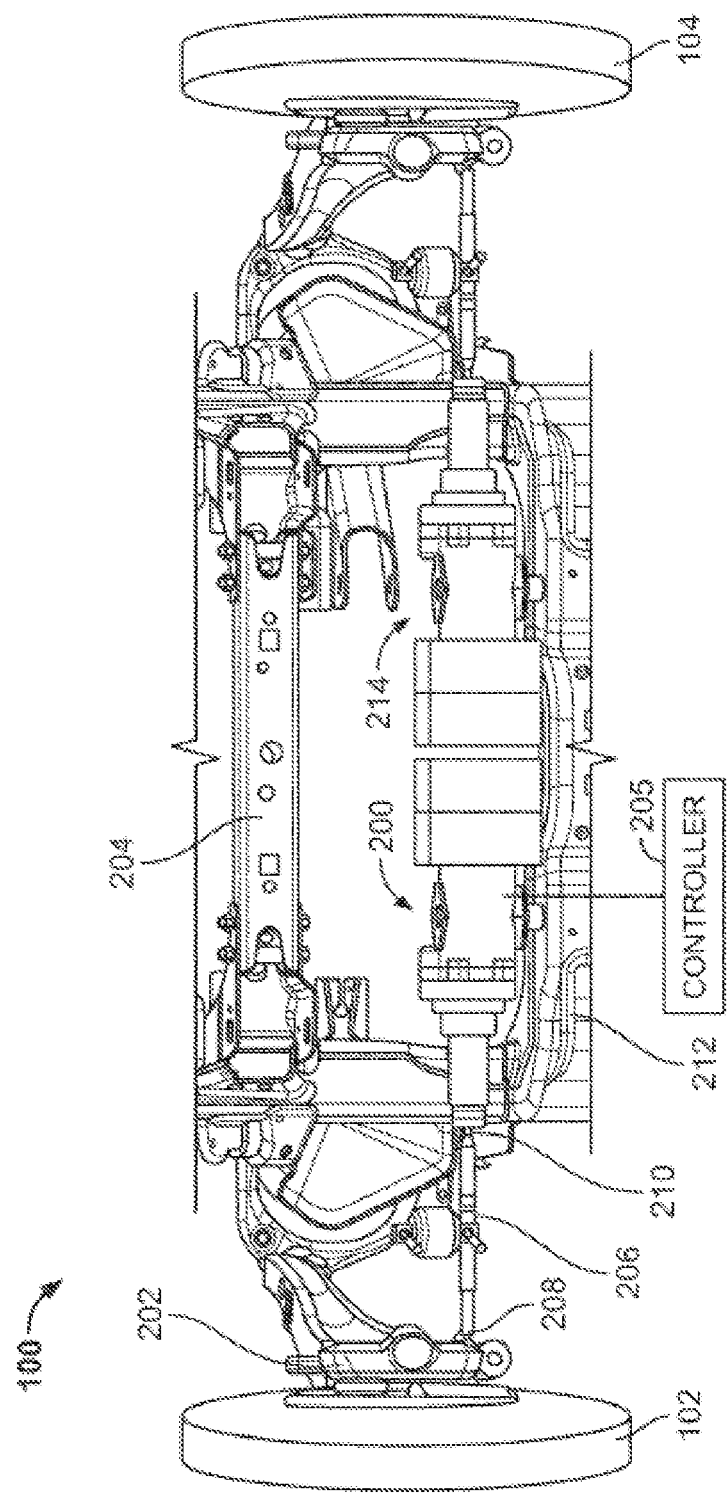
FIG. 2 illustrates an example steering actuator of the example vehicle of FIG. 1.

FIG. 2 illustrates a bottom view of a portion of the undercarriage of the vehicle 100 (without the body of the vehicle 100) showing an example first actuator 200 that may be used to steer the vehicle 100. As illustrated in FIG. 2, the vehicle 100 includes a steering knuckle 202 (referred to herein as the knuckle 202). The first front wheel 102 is coupled to the knuckle 202. The knuckle 202 is pivotably coupled to a frame 204 of the vehicle 100. The knuckle 202 pivots to turn the first front wheel 102 (e.g., to the left or right).

To rotate the knuckle 202 and the first front wheel 102, the example vehicle 100 employs the first actuator 200. The first actuator 200 is a linear actuator that is coupled to the knuckle 202. The first actuator 200 operates to rotate the knuckle 202 (and, thus, the first front wheel 102) back-and-forth, thereby turning the first front wheel 102 and steering the vehicle 100. In the illustrated example, the first actuator 200 is activated by a controller (e.g., an ECU) 205. The controller 205 may be part of and receive commands from a steer-by-wire system (e.g., based on a steering wheel angle) and/or from an autonomous driving mode program.

In the illustrated example, the first actuator 200 is coupled to the knuckle 202 via a tie rod 206 of the vehicle 100. The tie rod 206 has a first end 208 and a second end 210 opposite the first end 208. The first end 208 of the tie rod 206 is coupled to the knuckle 202 and the second end 210 of the tie rod 206 is coupled to the first actuator 200. The first actuator 200 may be activated to extend and/or retract the tie rod 206 (e.g., move the tie rod 206 left or right in FIG. 2) to turn or angle the knuckle 202 and the first front wheel 102, thereby steering the vehicle 100. In the illustrated example, the first actuator 200 is coupled to a cross-bar 212 of the frame 204 extending across a width of the vehicle 100. In other examples, the first actuator 200 may be coupled to one or more other members of the frame 204.

In the illustrated example, the vehicle 100 includes a second actuator 214 for turning the second front wheel 104. The second actuator 214 is substantially the same as the first actuator 200. Thus, to avoid redundancy, a description of the second actuator 214 is not provided. However, it is understood that any of the structures and/or functions disclosed in connection with the first actuator 200 can likewise be applied to the second actuator 214. Further, other actuators may be similarly utilized in connection with other wheels of the vehicle 100, such as the rear wheels of the vehicle 100. The actuators 200, 214 operate independently to steer the respective first and second front wheels 102, 104. In other words, activation of the first actuator 200 does not affect the steering of the second front wheel 104. Independent control of each wheel enables a smaller turning radius, for example. Further, by not having a mechanical linkage/steering assembly between the knuckles, use of the actuators 200, 214 frees up valuable space in the undercarriage of the vehicle 100. The second actuator 214 may be controlled via the same controller 205 or a different controller. In the illustrated example, the second actuator 214 is coupled to the cross-bar 212 adjacent the first actuator 200.

In some examples, the actuator(s) 200, 214 is/are part of a steer-by-wire system for the vehicle 100. In a steer-by-wire system, a steering wheel angle (SWA) sensor is used to measure the rotational angle of a steering wheel. The controller 205 activates the actuator(s) 200, 214 to turn the respective first and second front wheels 102, 104 based on the SWA. The controller 205 may apply a linear or non-linear relationship between the SWA and the angle of the first and second front wheels 102, 104. Additionally or alternatively, the actuator(s) 200, 214 may be utilized by an autonomous driving program to autonomously steer the vehicle 100.

While in the illustrated example the actuators 200, 214 are shown as separate actuators, in other examples, the actuators 200, 214 may be integrated and/or operate as a single actuator. For example, the knuckles may be mechanically coupled (e.g., via one or more struts or tie rods), such that turning one wheel affects the other wheel. In such an example, the actuators 200, 214 may operate in unison to steer the first and second front wheels 102, 104.

In the illustrated example, the first actuator 200 is not mechanically connected to or operated by the steering wheel assembly. However, in other examples, the first actuator 200 may be activated via physical input from a steering assembly. For example, the first actuator 200 may be incorporated as part of an electronic power assisted steering (EPAS) system.

Figure 3:
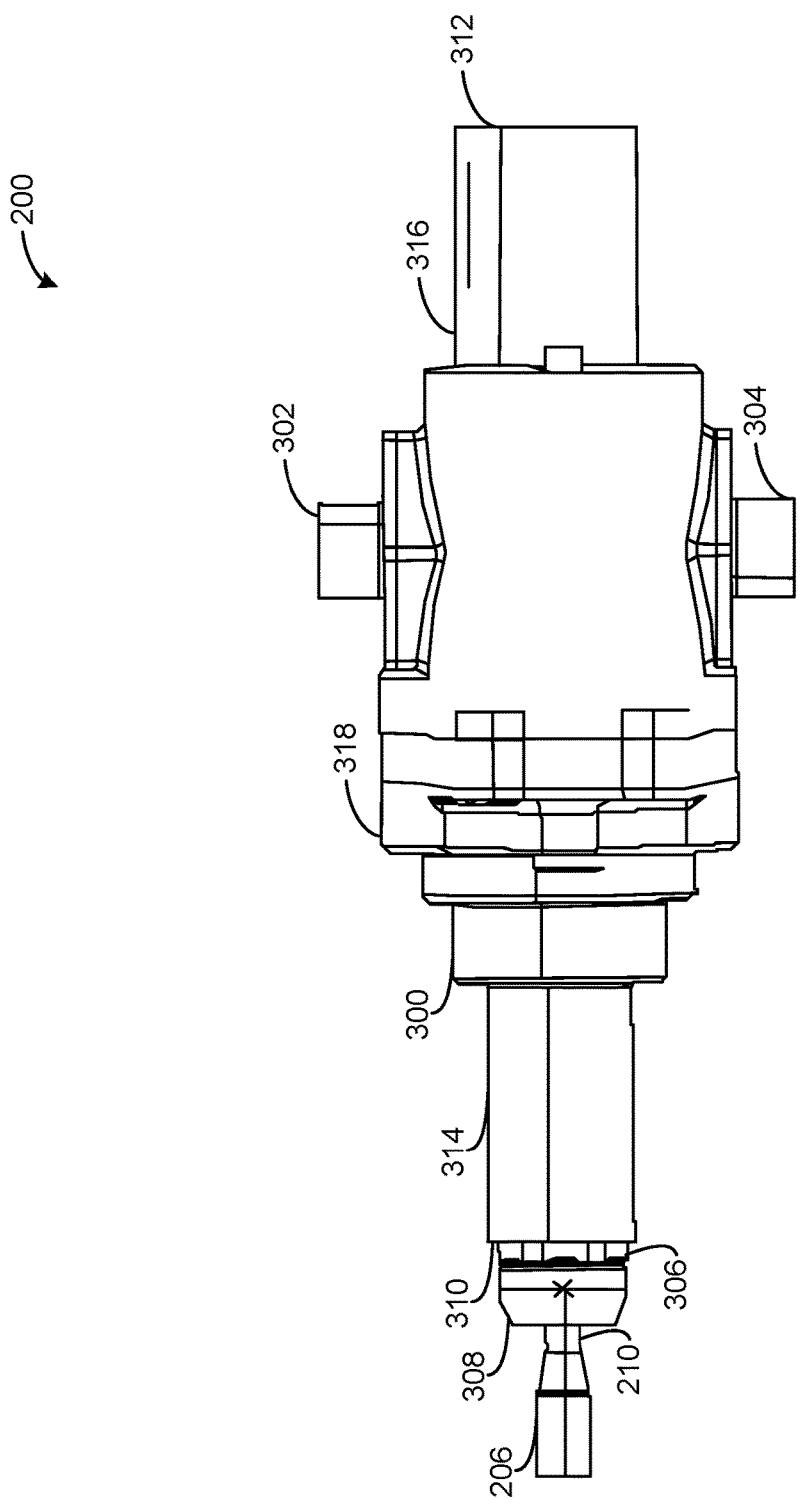
FIG. 3 illustrates the example steering actuator of FIG. 2 within an example housing.

FIG. 3 illustrates a first view (e.g., a side view) of the example first actuator 200 of FIG. 2. As shown in FIG. 3, the first actuator 200 includes a housing 300. The housing 300 contains the internal components of the first actuator 200 (e.g., a ball nut, a rack, a motor, etc.) disclosed in further detail herein. In the illustrated example, the first actuator 200 includes a first mount 302 that is coupled to the housing 300. The first mount 302 is used to couple the first actuator 200 to another structure, such as the cross-bar 212 in the vehicle 100 as shown in FIG. 2. In some examples, the first actuator 200 includes a second mount 304 (disposed on the opposite side of the housing 300 from the first mount 302), which may be used in addition to or as an alternative to the first mount 302 to couple the first actuator 200 to the vehicle 100. In some examples, the first actuator 200 is reversible, and may be used for either the first front wheel 102 or the second front wheel 104. For example, if the first actuator 200 is used with the first front wheel 102, the first mount 302 can be used to couple the first actuator 200 to the vehicle 100 or, if the first actuator 200 is used with the second front wheel 104, the second mount 304 can be used to couple the first actuator 200 to the vehicle 100.

In the illustrated example, the first actuator 200 includes a rack 306 (which may be referred to as a screw or ball screw). A first end 308 of the rack 306 extends outward from an opening in a first end 310 of the housing 300. The housing 300 has a second end 312 opposite the first end 310. In the illustrated example, the second end 210 of the tie rod 206 is coupled to the first end 308 of the rack 306. The first actuator 200 operates to move the rack 306 linearly between a fully retracted position (a first position), as shown in FIG. 3, and a fully extended position (a second position), in which the first end 308 of the rack 306 is moved outward, away from the first end 310 of the housing 300. In some examples, the tie rod 206 is coupled to the rack 306 via a ball joint, such that the tie rod 206 can pivot relative to the rack 306. In other examples, the tie rod 206 is coupled to the rack 306 via a fixed joint. The first actuator 200, when activated, operates to move the rack 306 in a linear direction outward from or into the opening in the first end 308 of the housing 300, thereby moving the tie rod 206 to steer the first front wheel 102. In some examples, a boot or bellows is used to cover the opening in the first end 310 of the housing 300 to prevent dirt, water, and/or other debris from entering the housing 300 as the rack 306 is moved into and out of the housing 300. The boot or bellows may be coupled to the housing 300 and the tie rod 206, for example. In other examples, instead of utilizing the tie rod 206, the rack 306 may be coupled directly to the knuckle 202.

In some examples, the housing 300 is constructed of two or more portions or sections. For example, in the illustrated example of FIG. 3, the housing 300 includes a first section 314, a second section 316, and a third section 318. The third section 318 is disposed between the first and second sections 314, 316. In the illustrated example, the first and second sections 314, 316 couple together at the third section 318 and form an enlarged area (e.g., having an enlarged diameter) that houses a ball nut and a sensor, as disclosed in further detail herein. While in the illustrated example three housing sections are implemented, in other examples, the housing 300 may be constructed of more or fewer sections.

Figure 4:
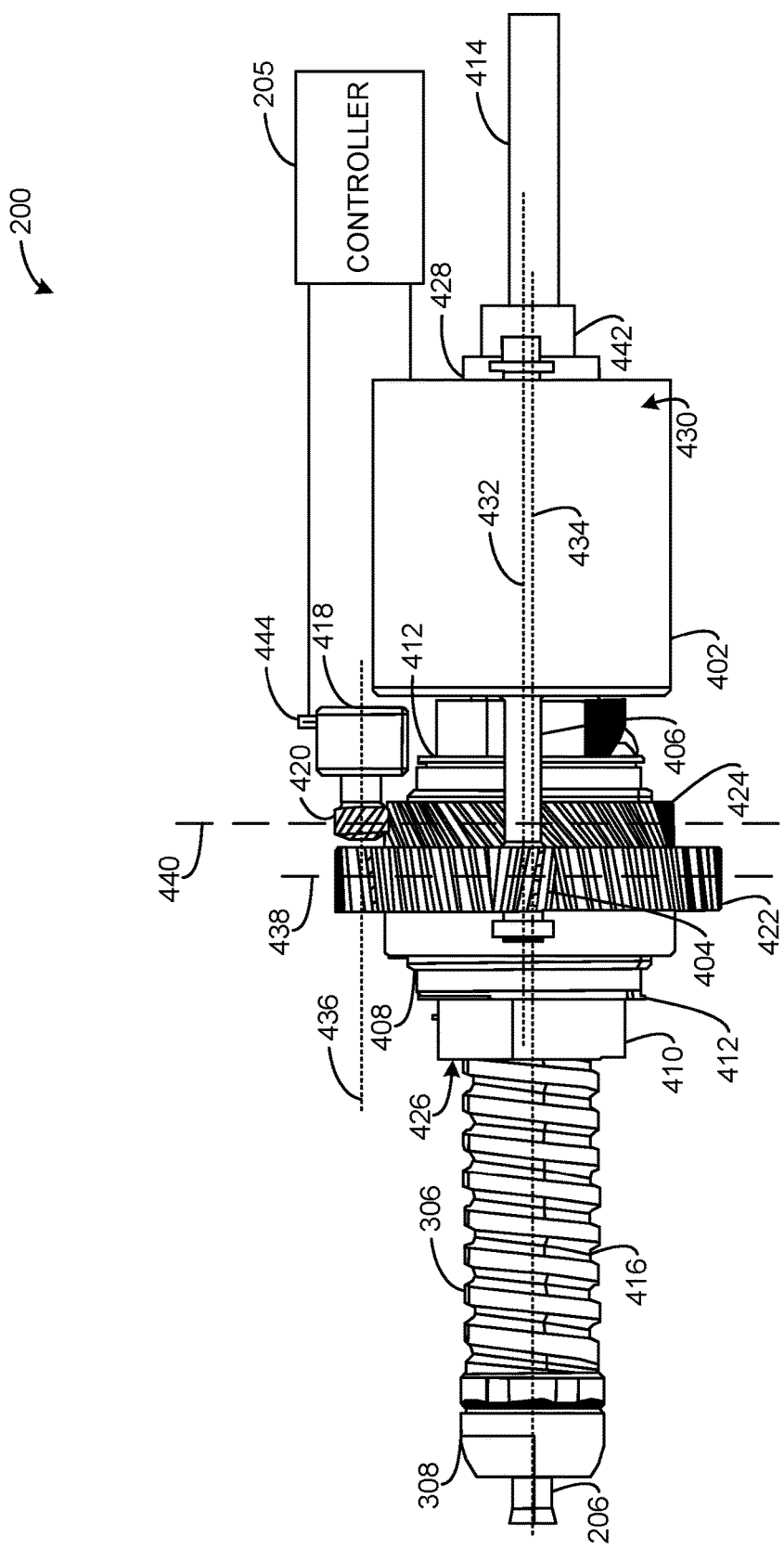
FIG. 4 illustrates the example steering actuator of FIGS. 2 and/or 3 with the housing removed.

FIG. 4 illustrates the first steering actuator 200 with the housing 300 (FIG. 3) removed. As shown in FIG. 4, the first actuator 200 includes a motor 402 and a first pinion 404 fixed to a shaft 406 of the motor 402. In FIG. 4, the first actuator 200 further includes a geared thrust bearing 408, a ball nut 410, spring washers 412, an anti-rotation rod 414, and a sensor (e.g., a rotary encoder, a position sensor, a torque sensor, etc.) 418 fixed to a second pinion 420. In FIG. 4, the first actuator 200 is operatively coupled to the controller 205.

In FIG. 4, the geared thrust bearing 408 includes a first ring gear 422 and a second ring gear 424. In FIG. 4, the first ring gear 422 is engaged with the first pinion 404 and the second ring gear 424 is engaged with the second pinion 420. In FIG. 4, the first ring gear 422 has a first diameter and the second ring gear 424 includes a second diameter less than the first diameter. However, it should be understood that examples disclosed herein could be implemented with the first ring gear 422 and the second ring gear 424 having a same diameter. For example, the first ring gear 422 and the second ring gear 424 could be implemented by a single ring gear engaged with the first pinion 404 and the second pinion 420.

In FIG. 4, the geared thrust bearing 408 is fixedly coupled to and disposed around the ball nut 410. The geared thrust bearing 408 may be coupled to the ball nut 410 via any mechanical and/or chemical fastening technique (e.g., via an adhesive, via a threaded fastener, via teeth, via friction fit, via welding, etc.). As such, the first ring gear 422 and the second ring gear 424 are coupled to and disposed around the ball nut 410 (or, for example, it can be considered that the geared thrust bearing 408 includes an internal ball nut 410).

In FIG. 4, the geared thrust bearing 408 is coupled to the spring washers 412 disposed at opposite ends thereof. Specifically, the spring washers 412 are disposed between an inner surface of the housing 300 and the first ring gear 422 and/or the second ring gear 424. In FIG. 4, the spring washers 412 rotatably couple the geared thrust bearing 408 to the third section 318 of the housing 300. The geared thrust bearing 408 and the spring washers 412 support axial loading between the first ring gear 422, the second ring gear 424, and/or the ball nut 410 and the inner surface of the housing 300. As such, the geared thrust bearing 408 and the ball nut 410 are rotatable within the housing 300 but the spring washers 412 resist linear movement thereof. In addition, as shown in FIG. 3, the section of the housing 300 that contains the geared thrust bearing 408 and the ball nut 410 is enlarged, which enables the geared thrust bearing 408 and the ball nut 410 to rotate in the housing 300.

In FIG. 4, the ball nut 410 is a sleeve defining an opening 426. In FIG. 4, the rack 306 is disposed within and extends through the opening 426 of the ball nut 410. The rack 306 includes threads 416 extending along at least a portion thereof between the first end 308 of the rack 306 and a second end 428 of the rack 306 opposite the first end 308. The ball nut 410 includes a series of bearing balls or rollers within the opening 426 that form a helical path that meshes with the threads 416 of the rack 306.

In FIG. 4, the controller 205 activates the motor 402 to drive a rotation of the shaft 406 and, thus, the first pinion 404, which is engaged with the first ring gear 422. As such, the motor 402 rotates the geared thrust bearing 408 and the ball nut 410, via the first pinion 404 and the first ring gear 422, which causes the rack 306 to move linearly through the opening 426 of the ball nut 410 (left or right in FIG. 4 depending on the direction of rotation). Specifically, when the first ring gear 422 is rotated in one direction, the rack 306 moves linearly in one direction, and when the first ring gear 422 is rotated in the opposite direction, the rack 306 moves linearly in the opposite direction. The linear movement of the rack 306 extends or retracts the tie rod 206 to turn or angle the knuckle 202 of the first front wheel 102, thereby steering the vehicle 100.

In the illustrated example of FIG. 4, the motor 402 includes a rotary encoder 430 to detect a position (e.g., a rotation) of the shaft 406. In some examples, the rotary encoder 430 provides a signal indicative of the rotation of the shaft 406 of the motor 402 to the controller 205. As such, the controller 205 can determine a first position of the rack 306 based on the position of the shaft 406 of the motor 402.

In some examples, the motor 402 encounters torque as a result of static friction between the rack 306 and the ball bearings within the ball nut 410. The torque of the motor 402 needs to overcome the static friction between the rack 306 and the ball bearings to drive the rotation of the first ring gear 422. As a result, the relationship between the rotation of the shaft 406 of the motor 402 and the position of the rack 306 can be affected by the static friction, especially with small changes in the position of the rack 306 that result from smaller forces. In some examples, the static friction causes the geared thrust bearing 408 and, thus, the ball nut 410 to axially deflect, which compresses one of the spring washers 412. In such examples, the axial deflection of the geared thrust bearing 408 causes the signal indicative of the rotation of the shaft 406 of the motor 402 to become distorted.

In the illustrated example of FIG. 4, the second ring gear 424 rotates with the geared thrust bearing 408 when the motor 402 rotates the first ring gear 422. In turn, the second ring gear 424 rotates the second pinion 420. In other words, the second pinion 420 rotates with the geared thrust bearing 408 and the ball nut 410. As such, the rotation of the second pinion 420 corresponds to a movement of the rack 306.

In the illustrated example of FIG. 4, the sensor 418 detects a rotation of the second pinion 420 and, thus, a rotation of the ball nut 410. As a result, the rotation detected by the sensor 418 corresponds to a position of the rack 306. In the illustrated example, the sensor 418 is a rotary encoder. However, in some other examples, other position sensors, such as a torque sensor or one or more Hall effect sensors, can be utilized to detect the rotation of the ball nut 410 and, thus, the movement of the rack 306.

In the illustrated example of FIG. 4, the sensor 418 includes a harness connector 444 through which the sensor 418 operatively couples to the controller 205. That is, a wire harness in connection with the controller 205 is connected to the harness connector 444 to operatively couple the sensor 418 to the controller 205. In FIG. 4, the sensor 418 provides a signal indicative of the rotation of the second pinion 420 to the controller 205. As a result, the controller 205 determines a second position of the rack 306 based on the rotation of the second pinion 420 and/or the ball nut 410. In some examples, when the rack 306 encounters a force, the signal indicative of the rotation of the second pinion 420 distorts as a result of the axial deflection of the geared thrust bearing 410. Specifically, the axial deflection of the geared thrust bearing 408 moves the second ring gear 424, which affects the signal indicative of the rotation of the second pinion 420.

Figure 5:
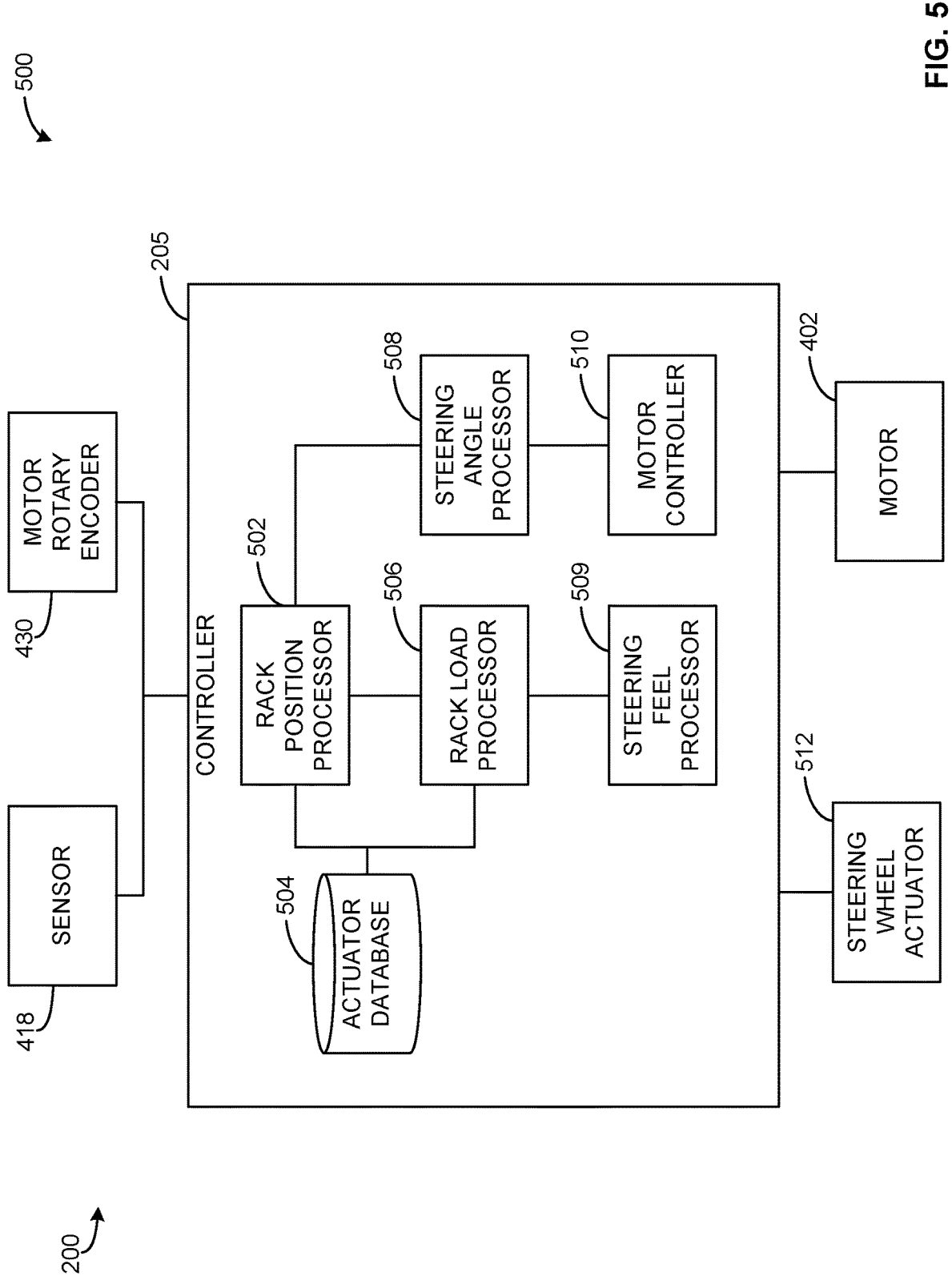
FIG. 5 is a block diagram of an example controller associated with the steering actuator of FIGS. 2, 3, and/or 4.

In some examples, the controller 205 utilizes both the first position of the rack 306 based on the rotation of the shaft 406 of the motor 402 and the second position of the rack 306 based on the rotation of the second pinion 420 to determine a force encountered by the rack 306, as discussed further in association with FIGS. 5 and/or 6. The controller 205 can utilize a lead of the rack 306 and/or the ball nut 410 in addition to a pitch diameter and/or a helix lead angle of the first pinion 404, the second pinion 420, the first ring gear 422, and/or the second ring gear 424 to determine the first and second positions of the rack 306. When the rack 306 encounters a load, different helix lead angles of the first pinion 404 and the second pinion 420 result in the first position of the rack 306 being different from the second position. Specifically, a difference or distortion between the first and second positions of the rack 306 corresponds to a deflection and/or position of the geared thrust bearing 408 and the ball nut 410. Accordingly, the controller 205 can determine a compression of the spring washers 412 based on the first and second positions of the rack 306. In some examples, the controller 205 determines the force encountered by the rack 306 based on the spring rate of the spring washers 412 and the deflection and/or position of the geared thrust bearing 408. Accordingly, the controller 205 can determine a steering feel to provide to the driver based on the force encountered by the rack 306.

In the illustrated example of FIG. 4, the first pinion 404 and the shaft 406 of the motor 402 are positioned along a first axis of rotation 432. In FIG. 4, the rack 306, the ball nut 410, and the geared thrust bearing 408 including the first and second ring gears 422, 424 are positioned along a second axis of rotation 434 parallel to the first axis of rotation 432. Further, the second pinion 420 is positioned along a third axis of rotation 436 parallel to the second axis of rotation 434. In some examples, a placement of the third axis of rotation 436 is orbital relative to the second axis of rotation 434. Specifically, the second pinion 420 can be positioned anywhere along a 360° orbit of the second ring gear 424 given that the second pinion 420 is engaged with the second ring gear 424. In FIG. 4, the first pinion 404 and the first ring gear 422 are aligned along a first plane 438. In FIG. 4, the second pinion 420 and the second ring gear 424 are aligned along a second plane 440 parallel to the first plane 438.

In general, when the ball nut 410 rotates, the rack 306 has a tendency to rotate with the ball nut 410 rather than move linearly. In FIG. 4, a slide locator 442 fixed to the second end 428 of the rack 306 slidably surrounds the anti-rotation rod 414 to prevent the rack 306 from rotating. In FIG. 4, the anti-rotation rod 414 extends along at least a portion of the rack 306. In some examples, the anti-rotation rod 414 is coupled to and extends from the third section 318 of the housing 300. Thus, the anti-rotation rod 414 remains stationary relative to the housing 300. In other examples, the anti-rotation rod 414 may be coupled to another section of the housing 300 and/or another structure (e.g., to the crossbar 212 (FIG. 2) adjacent the first actuator 200). When the first actuator 200 is assembled, the anti-rotation rod 414 is disposed within the housing 300 (FIG. 3) (e.g., within the second section 316 of the housing 300 with the rack 306).

In the illustrated example of FIG. 4, the slide locator 442 is coupled to and extends outward from the rack 306. The slide locator 442 is slidable along the anti-rotation rod 414. As the rack 306 translates back-and-forth, the slide locator 442 slides along the anti-rotation rod 414 and prevents the rack 306 from rotating. In other examples, other types of tracks or structures may be used to prevent rotation of the rack 306.

FIG. 5 illustrates an example block diagram 500 of the controller 205 associated with the first actuator 200. In the illustrated example of FIG. 5, the controller 205 is operatively coupled to the motor 402, the sensor 418, and the motor rotary encoder 430 associated with the first actuator 200. In FIG. 5, the controller 205 includes a rack position processor 502, an actuator database 504, a rack load processor 506, a steering angle processor 508, a steering feel processor 509, and a motor controller 510. In FIG. 5, the block diagram 500 further includes a steering wheel actuator 512 operatively coupled to a steering wheel associated with the vehicle 100.

In the illustrated example of FIG. 5, the motor rotary encoder 430 provides a signal indicative of the position (e.g., the rotation) of the motor 402 (e.g., the shaft 406 of the motor 402) to the controller 205. In FIG. 5, the sensor 418 provides a signal indicative of the rotation of the second pinion 420 and, thus, the ball nut 410 to the controller 205.

In the illustrated example of FIG. 5, the actuator database 504 stores a geometry (e.g., a pitch diameter, a helix angle, a lead, etc.) of the gears associated with the actuator (e.g., the rack 306, the first pinion 404, the ball nut 410, the second pinion 420, the first ring gear 422, and the second ring gear 424 (FIG. 4)) and a spring rate of the spring washers 412.

In FIG. 5, the rack position processor 502 obtains the known geometry of the gears associated with the first actuator 200 via the actuator database 504. In FIG. 5, the rack position processor 502 determines a first position of the rack 306 based on the position of the first pinion 404 (e.g., the position of the shaft 406) and the geometry of the gears associated with the first actuator 200. In FIG. 5, the rack position processor 502 determines a second position of the rack 306 based on the rotation of the second pinion 420 and the geometry of the gears associated with the first actuator 200. In FIG. 5, the rack position processor 502 transmits the first position and the second position to the rack load processor 506. In some examples, the rack position processor 502 transmits at least one property associated with the signal indicative of the first position and/or the signal indicative of the second position to the rack load processor 506, such as a signal-to-noise ratio. In FIG. 5, the rack position processor 502 transmits the first position and the second position to the steering angle processor 508.

In the illustrated example of FIG. 5, the rack load processor 506 obtains a known a spring rate of the spring washers 412 (FIG. 4) and the geometry of the gears associated with the first actuator 200 via the actuator database 504. In FIG. 5, the rack load processor 506 compares the first position of the rack 306 to the second position of the rack 306 to determine whether the rack 306 is encountering a load. The rack load processor 506 can determine the rack 306 is encountering a load in response to the first position being different from the second position.

In FIG. 5, when the rack is encountering a load, the first and second positions distort by different amounts as the geared thrust bearing 408 deflects. In some examples, the difference between the first position and the second position results from the different helix lead angles of the first pinion 404 and the second pinion 420. Specifically, the different helix lead angles of the first and second pinions 404, 420 result in the first and second positions being distorted by different amounts when the rack 306 encounters a load. For example, the signal-to-noise ratios associated with the signal indicative of the first position of the rack 306 and the signal indicative of the second position of the rack 306 can correspond to the different helix lead angles of the first and second pinions 404, 420, respectively, and a linear deflection of the geared thrust bearing 408.

In FIG. 5, when the rack 306 is encountering a load, the rack load processor 506 determines a linear deflection of the geared thrust bearing 408 and/or the ball nut 410 based on the first position, the second position, the geometry of the gears associated with the first actuator 200, and/or at least one property associated with the signals indicative of the first and second positions. In turn, the rack load processor 506 can determine the load on the rack 306 based on the spring rate of the spring washers 412 and the linear deflection of the geared thrust bearing 408. In some examples, the rack load processor 506 provides a signal indicative of the load on the rack 306 to the steering feel processor 509.

In the illustrated example of FIG. 5, the steering angle processor 508 determines a steering angle (e.g., an angle of at least one of the wheels 102, 104 of the vehicle 100) implemented by the first actuator 200 based on the first position and the second position of the rack 306. In some examples, the steering angle processor 508 compares the implemented steering angle to a target steering angle associated with a position of a steering wheel associated with the vehicle 100 and/or determined by an autonomous driving mode program. In some examples, the steering angle processor 508 provides a signal indicative of an adjustment to the implemented steering angle to the motor controller 510 in response to the implemented steering angle being different from the target steering angle.

In FIG. 5, the steering feel processor 509 determines a steering feel to implement at the steering wheel associated with the vehicle 100 based on the load encountered by the rack 306. For example, the steering feel processor 509 can determine a torque to be encountered by the driver at the steering wheel based on the load encountered by the rack 306. As such, the steering feel processor 509 can control the steering feel that the driver of the vehicle 100 encounters with improved accuracy and stability compared to known steering systems that are unable to detect rack forces of lower magnitudes (e.g., less than 300 N). In some examples, the controller 205 provides a signal indicative of the steering feel to be implemented at the steering wheel to the steering wheel actuator 512.

In FIG. 5, the motor controller 510 determines an output of the motor 402 that adjusts the steering angle of at least one of the wheels 102, 104 to correspond with the target steering angle. For example, the motor controller 510 can determine a driving signal to be provided to the motor 402 based on the determined difference between the implemented steering angle and the target steering angle. Accordingly, the controller 205 can provide the driving signal to the motor 402, which enables the motor 402 to implement the adjustment to the steering angle.

In FIG. 5, the steering wheel actuator 512 can provide the driver with a steering feel that corresponds to the load encountered by the rack 306. For example, the steering wheel actuator 512 can implement a torque at the steering wheel associated with the vehicle 100 in response to obtaining the signal indicative of the steering feel to be implemented via the controller 205. As such, the steering feel implemented by the steering wheel actuator 512 allows the driver of the vehicle 100 to obtain improved road and tire dynamics compared to known steering systems that are unable to detect rack forces of lower magnitudes (e.g., less than 300 N).

While an example manner of implementing the controller 205 of FIGS. 2 and/or 4 is illustrated in FIG. 5, one or more of the elements, processes and/or devices illustrated in FIG. 5 may be combined, divided, re-arranged, omitted, eliminated and/or implemented in any other way. Further, the example rack position processor 502, the example actuator database 504, the example rack load processor 506, the example steering angle processor 508, the example steering feel processor 509, the example motor controller 510, and/or, more generally, the example controller 205 of FIGS. 2, 4 and/or 5 may be implemented by hardware, software, firmware and/or any combination of hardware, software and/or firmware. Thus, for example, any of the example rack position processor 502, the example actuator database 504, the example rack load processor 506, the example steering angle processor 508, the example steering feel processor 509, the example motor controller 510, and/or, more generally, the example controller 205 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, rack position processor 502, the example actuator database 504, the example rack load processor 506, the example steering angle processor 508, the example steering feel processor 509, the example motor controller 510, and/or the example controller 205 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 205 of FIGS. 2, 4 and/or 5 may include one or more elements, processes and/or devices in addition to, or instead of, those illustrated in FIG. 5, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
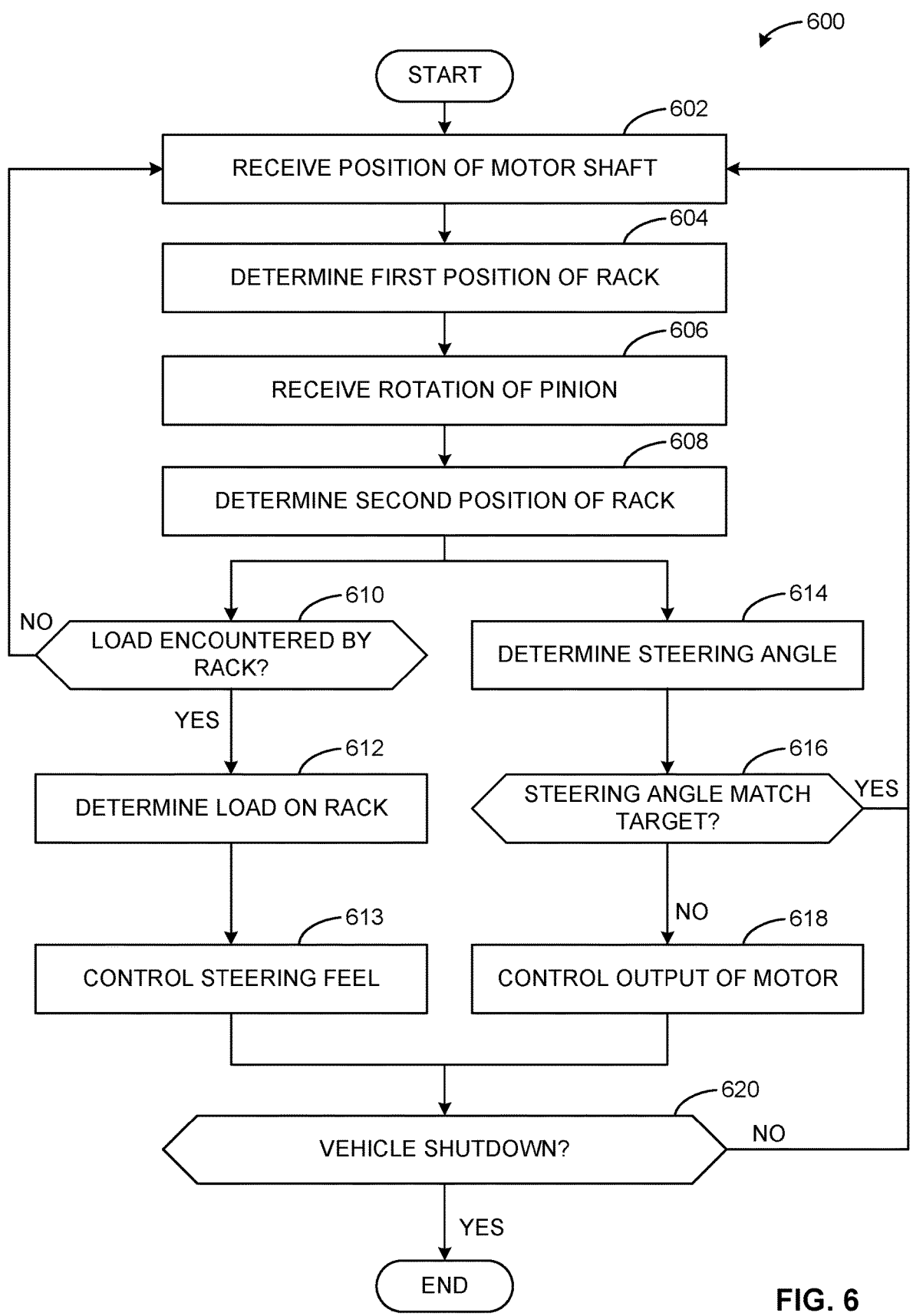
FIG. 6 is a flowchart representative of machine readable instructions which may be executed to implement the example controller associated with the steering actuator of FIGS. 2, 3, 4, and/or 5.

A flowchart representative of example hardware logic, machine readable instructions, hardware implemented state machines, and/or any combination thereof for implementing the controller of FIGS. 2, 4 and/or 5 is shown in FIG. 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example controller 205 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of machine readable instructions 600 which may be executed to implement the example controller 205 associated with the first steering actuator 200 of FIGS. 2, 3, 4, and/or 5. At block 602, the controller 205 receives a position (e.g., a rotation) of the shaft 406 of the motor 402. For example, the rack position processor 502 can receive the rotation of the shaft 406 and, thus, the pinion 404 of the motor 402 via the motor rotary encoder 430. In some examples, the shaft 406 of the motor 402 encounters a torque that distorts the measurement of the motor rotary encoder 430 in response to the motor 402 driving the first pinion 404 to rotate the first ring gear 422 and, in turn, the ball nut 410 to move the rack 306 linearly.

At block 604, the controller 205 determines a first position of the rack 306. For example, the rack position processor 502 can determine the first position of the rack 306 based on the position (e.g., the rotation of the shaft 406 of the motor 402. In some examples, the rack position processor 502 determines a geometry of the gears associated with the first actuator 200 (e.g., the rack 306, the first pinion 404, the ball nut 410, the second pinion 420, the first ring gear 422, and the second ring gear 424 (FIG. 4)) via the actuator database 504. In some examples, the rack position processor 502 determines the first position of the rack 306 based on the position of the shaft 406 of the motor 402 and the geometry of the gears associated with the first actuator 200. In some examples, the rack position processor 502 transmits the first position of the rack 306 to the rack load processor 506.

At block 606, the controller 205 receives a rotation of the second pinion 420. For example, the sensor 418 can provide a signal indicative of the rotation of the second pinion 420 to the controller 205. In such examples, the rack position processor 502 obtains the signal indicative of the rotation of the second pinion 420.

At block 608, the controller 205 determines a second position of the rack 306. For example, the rack position processor 502 can determine the second position of the rack based on the rotation of the second pinion 420, which corresponds to a rotation of the ball nut 410. In some examples, the rack position processor 502 determines the second position of the rack 306 based on the rotation of the second pinion 420, the axial position of the geared thrust bearing 408, and the geometry of the gears associated with the first actuator 200. In some examples, the rack position processor 502 transmits the second position of the rack 306 to the rack load processor 506. In response to determining the second position of the rack 306, the machine readable instructions proceed to block 610 and block 614.

At block 610, the controller 205 determines whether the rack 306 is encountering a load. For example, the rack load processor 506 compares the first position of the rack 306 to the second position of the rack 306. The rack load processor 506 determines that the rack 306 is encountering a load in response to the first position of the rack 306 being different from the second position of the rack 306. When the rack 306 is encountering a load, the machine readable instructions 600 proceed to block 612. Otherwise, when the rack 306 is not encountering a load, the machine readable instructions 600 return to block 602.

At block 612, the controller 205 determines the load encountered by the rack 306. For example, the rack load processor 506 determines the load encountered by the rack 306 based on a difference between the first position of the rack 306 and the second position of the rack 306. In some examples, the rack load processor 506 identifies a known spring rate of the spring washers 412 via the actuator database 504. In some examples, the rack load processor 506 determines the load encountered by the rack 306 based on the difference between the first and second positions of the rack 306 and the spring rate of the spring washers 412. In some examples, the signal indicative of the rotation of the first pinion 404 and/or the signal indicative of the rotation of the second pinion 420 include noise indicative of an axial position of the geared thrust bearing 408 and/or the ball nut 410. For example, a deflection of the geared thrust bearing 408 can distort the first position and/or the second position of the rack 306. Specifically, the first and second positions distort by different amounts when the geared thrust bearing 408 deflects. As such, the rack load processor 506 determines a linear deflection of the geared thrust bearing 408 based on the difference between the first and second positions. Further, the rack load processor 506 can determine a compression of the spring washers 412, which corresponds to the force on the rack 306, based on the difference between the first and second positions of the rack 306 and the spring rate of the spring washers 412. In some examples, the rack load processor 506 transmits the load encountered by the rack 306 to the steering angle processor 508 and the steering feel processor 509 as the machine readable instructions proceed to block 613 and block 614.

At block 613, the controller 205 controls a steering feel implemented at a steering wheel associated with the vehicle 100. For example, the steering feel processor 509 determines a torque to be implemented at the steering wheel based on the load encountered by the rack 306. In some examples, the controller 205 transmits a signal indicative of the torque to be implemented at the steering wheel to the steering wheel actuator 512. Accordingly, the steering wheel actuator 512 can implement the torque at the steering wheel to allow the driver to obtain a feel for the road and tire dynamics. The machine readable instructions proceed to block 620 in response to controlling the steering feel implemented at the steering wheel associated with the vehicle 100.

At block 614, the controller 205 determines a steering angle implemented by at least one of the wheels 102, 104 of the vehicle 100. For example, the steering angle processor 508 can determine the implemented steering angle based on the first position of the rack 306 and/or the second position of the rack 306.

At block 616, the controller 205 determines whether the implemented steering angle matches a target steering angle. For example, the steering angle processor 508 can determine the target steering angle based on a position of a steering wheel associated with the vehicle 100. In some examples, an autonomous driving program indicates the target steering angle to the steering angle processor 508. Further, the steering angle processor 508 can compare the target steering angle to the steering angle implemented by at least one of the wheels 102, 104. When the target steering angle matches the implemented steering angle, the machine readable instructions return to block 602. When the target steering angle is different from the implemented steering angle, the machine readable instructions proceed to block 618.

At block 618, the controller 205 controls an output of the motor 402. For example, the steering angle processor 508 can indicate a difference between the target steering angle and the implemented steering angle to the motor controller 510. Further, the motor controller 510 can determine an output of the motor 402 corresponding to a movement of the rack 306 that implements the target steering angle based on the difference between the target steering angle and the implemented steering angle. In some examples, the motor controller 510 determines a current and/or voltage of the signal that implements the determined output of the motor 402. Accordingly, the controller 205 can transmit the signal to the motor 402 to adjust the steering angle of the wheel(s) 102, 104 of the vehicle 100.

At block 620, the controller 205 determines whether the vehicle 100 is shutting down. When the vehicle 100 is not shutting down, the machine readable instructions 600 return to block 602. When the vehicle 100 is shutting down, the machine readable instructions 600 terminate.

Figure 7:
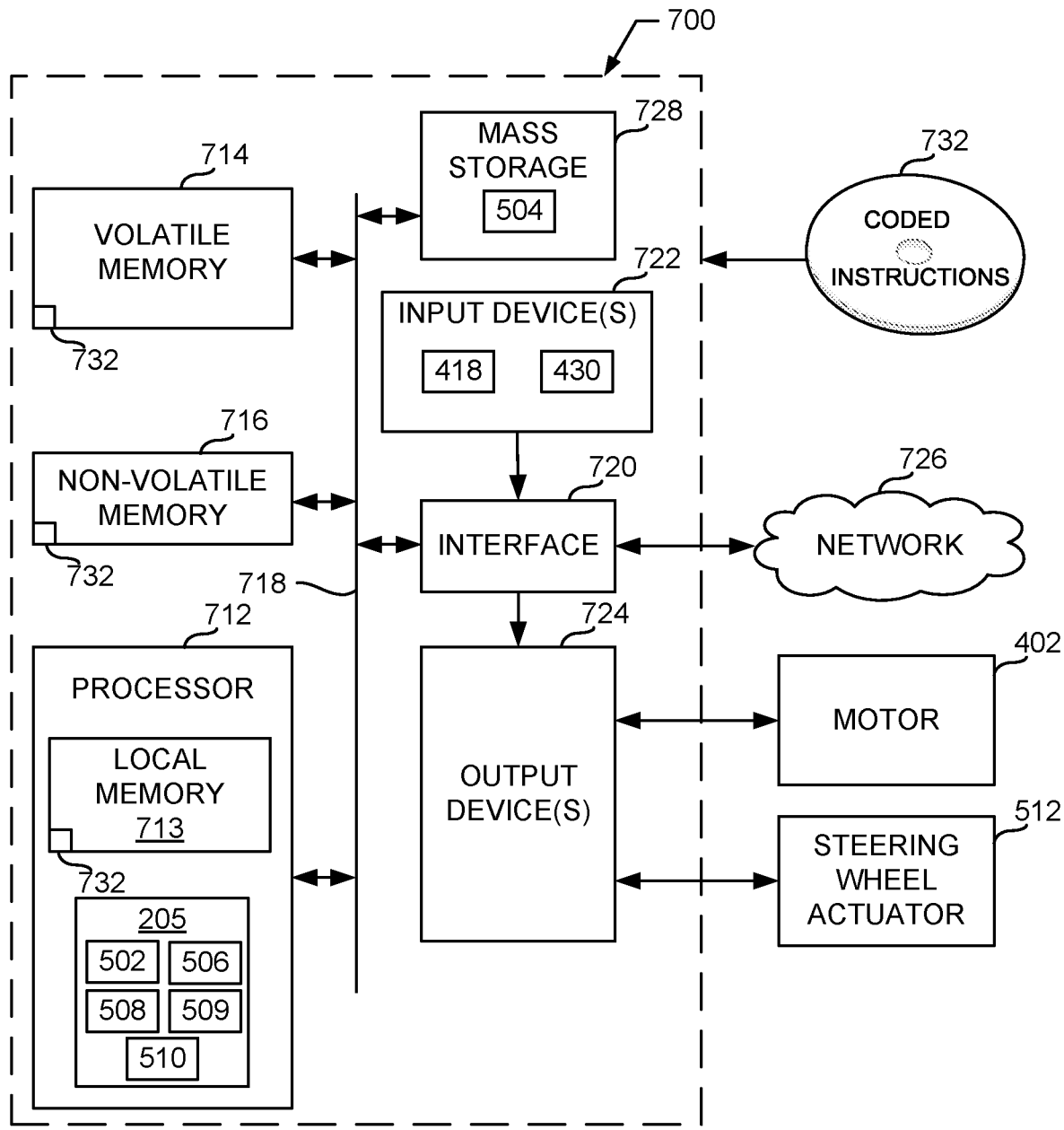
FIG. 7 is a block diagram of an example processing platform structured to execute the instructions of FIG. 3 to implement the example electronic control unit of FIG. 6.

FIG. 7 is a block diagram of an example processor platform 700 structured to execute the instructions of FIG. 6 to implement the controller 205 of FIGS. 2, 4 and/or 5. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the rack position processor 502, the rack load processor 506, the steering angle processor 508, the steering feel processor 509, and the motor controller 510.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint, and/or a voice recognition system. In this example, the input device(s) 722 include the sensor 418 and the motor torque sensor 430.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor. In this example, the output device(s) 724 are operatively coupled to the motor 402 and the steering wheel actuator 512.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that identify rack forces with an improved resolution at lower magnitudes (e.g., less than 300 Newtons (N)) compared to known steering actuators. Specifically, the examples disclosed herein eliminate or otherwise reduce an effect of friction encountered between the ball nut 410 and the rack 306 when determining the position of the rack 306 and/or the load on the rack 306. As such, the examples disclosed herein identify rack forces at lower magnitudes and/or a greater resolution compared to known steering actuators. Accordingly, the examples disclosed herein can control the steering of the vehicle more precisely than known steering actuators.

Example methods, apparatus, systems, and articles of manufacture to determine loads encountered by a steering rack are disclosed herein. Further examples and combinations thereof include the following:

Example 1 includes an apparatus comprising a rack to couple to a steering knuckle of a vehicle, a ball nut engaged with the rack, a first ring gear coupled to the ball nut, a first pinion fixed to a motor, the first pinion engaged with the first ring gear, the motor to rotate the ball nut, via the first pinion and the first ring gear, to move the rack, a motor encoder to detect a rotation of the first pinion, a second ring gear coupled to the ball nut, and a sensor fixed to a second pinion, the second pinion engaged with the second ring gear, the second pinion to rotate as the second ring gear rotates, the sensor to detect a rotation of the second pinion, the rotation of the second pinion and the rotation of the first pinion corresponding to a force on the rack.

Example 2 includes the apparatus of example 1, further including an electronic control unit to determine the force on the rack based on the rotation of the first pinion and the rotation of the second pinion.

Example 3 includes the apparatus of example 2, further including spring washers to couple the ball nut to a housing, the electronic control unit to determine the force on the rack based on a spring rate of the spring washers.

Example 4 includes the apparatus of example 2, wherein the electronic control unit determines the force on the rack based on a shape of the first ring gear and a shape of the second ring gear.

Example 5 includes the apparatus of example 1, wherein the first ring gear has a first diameter and the second ring gear includes a second diameter less than the first diameter.

Example 6 includes the apparatus of example 1, wherein the first pinion and the first ring gear are aligned along a first plane of rotation, and the second pinion and the second ring gear are aligned along a second plane of rotation parallel to the first plane of rotation.

Example 7 includes the apparatus of example 1, wherein the sensor is a rotary encoder.

Example 8 includes the apparatus of example 1, wherein the sensor is to provide a signal indicative of the rotation of the second pinion to an electronic control unit.

Example 9 includes a steering actuator comprising a rack, a ball nut coupled to the rack, a motor to rotate the ball nut to translate the rack, a first sensor to detect a rotation of a shaft of the motor, and a second sensor to detect a rotation of the ball nut, the second sensor separate from the motor, the rotation of the ball nut and the rotation of the shaft of the motor corresponding to a force on the rack.

Example 10 includes the steering actuator of example 9, further including a geared thrust bearing coupled to the ball nut.

Example 11 includes the steering actuator of example 10, further including a pinion fixed to the second sensor, the pinion engaged with the geared thrust bearing, the second sensor to detect the rotation of the ball nut based on a rotation of the pinion.

Example 12 includes the steering actuator of example 11, further including spring washers to rotatably couple the geared thrust bearing to a housing.

Example 13 includes the steering actuator of example 11, further including an electronic control unit to determine the force on the rack based on the rotation of the pinion and the rotation of the shaft of the motor.

Example 14 includes the steering actuator of example 11, wherein the rack and the ball nut are aligned along a first axis, the pinion is aligned along a second axis parallel to the first axis, and the motor is aligned along a third axis parallel to the second axis.

Example 15 includes the steering actuator of example 14, wherein the second axis is orbital relative to the first axis.

Example 16 includes the steering actuator of example 11, wherein the pinion is a first pinion, further including a second pinion fixed to the motor, the first pinion engaged with a first portion of the geared thrust bearing, the second pinion engaged with a second portion of the geared thrust bearing.

Example 17 includes a vehicle comprising a steering knuckle, a tie rod, a first end of the tie rod coupled to the steering knuckle, and an actuator including a rack, a second end of the tie rod coupled to the rack, a ball nut coupled to the rack, a first ring gear coupled to and disposed around the ball nut, a motor to drive the first ring gear to rotate the ball nut, a first sensor to detect a rotation of a shaft of the motor, a second ring gear coupled to and disposed around the ball nut, a pinion engaged with the second ring gear, and a second sensor fixed to the pinion, the sensor to detect a rotation of the pinion, the rotation of the pinion and the rotation of the shaft of the motor corresponding to a force on the rack.

Example 18 includes the vehicle of example 17, further including a housing, wherein the first ring gear, the second ring gear, and the sensor are disposed in the housing.

Example 19 includes the vehicle of example 18, further including a thrust bearing coupled to and disposed around the ball nut, the thrust bearing coupled to a spring washer, the spring washer disposed between an inner surface of the housing and the first ring gear or the second ring gear, the thrust bearing and the spring washer to support axial loading between the first ring gear or the second ring gear and the inner surface of the housing.

Example 20 includes the vehicle of example 19, further including an electronic control unit to determine the force on the rack based on the rotation of the shaft of the motor, the rotation of the pinion, a helix angle of the first ring gear, a helix angle of the second ring gear, and a spring rate of the spring washer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    a rotary encoder to generate a first signal based on a position of a motor shaft that includes a first pinion engaged with a first ring gear;
    a sensor to generate a second signal based on a rotation of a second pinion that is engaged with a second ring gear;
    machine readable instructions; and
    processor circuitry configured to execute or execute the machine readable instructions to determine a load on a steering rack of a vehicle based on the first signal and the second signal.

2. The apparatus of claim 1, wherein the processor circuitry is to control a torque on a steering wheel based on the load.

3. The apparatus of claim 1, wherein the processor circuitry is to:
    determine a first position of the steering rack based on the first signal;
    determine a second position of the steering rack based on the second signal;

when the first position is different from the second position, determine the steering rack has a non-zero load; and when the first position matches the second position, determine the load is zero.

4. The apparatus of claim 3, wherein, when the first position is different from the second position, the processor circuitry is to determine a value of the non-zero load based on a difference between the first position and the second position.

5. The apparatus of claim 4, wherein, when the first position is different from the second position, the processor circuitry is to determine the value of the non-zero load based on a spring rate of a spring that resists linear movement of the first ring gear and the second ring gear.

6. The apparatus of claim 1, wherein the processor circuitry is to determine a steering angle implemented by wheels of the vehicle based on at least one of the first signal or the second signal.

7. The apparatus of claim 6, wherein the processor circuitry is to:
determine whether the steering angle matches a target steering angle associated with a position of a steering wheel; and
when the steering angle is different from the target steering angle, control an output of a motor to adjust the steering angle based on a difference between the steering angle and the target steering angle.

8. A non-transitory machine readable storage medium comprising instructions to cause processor circuitry to at least determine a load encountered by a steering rack of a vehicle based on (i) a first signal corresponding to a position of a motor shaft and (ii) a second signal corresponding to a rotation of a pinion separate from the motor shaft.

9. The non-transitory machine readable storage medium of claim 8, wherein the instructions cause the processor circuitry to control a torque on a steering wheel based on the load.

10. The non-transitory machine readable storage medium of claim 8, wherein the instructions cause the processor circuitry to:
determine a first position of the steering rack based on the first signal;
determine a second position of the steering rack based on the second signal;
when the first position is different from the second position, determine the steering rack has a non-zero load; and
when the first position matches the second position, determine the load is zero.

11. The non-transitory machine readable storage medium of claim 10, wherein, when the first position is different from the second position, the instructions cause the processor circuitry to determine a value of the non-zero load based on a difference between the first position and the second position.

12. The non-transitory machine readable storage medium of claim 11, wherein, when the first position is different from the second position, the instructions cause the processor circuitry to determine the value of the non-zero load based on a spring rate of a spring that resists linear movement of a geared thrust bearing engaged with the motor shaft and the pinion.

13. The non-transitory machine readable storage medium of claim 8, wherein the instructions cause the processor circuitry to determine a steering angle implemented by wheels of the vehicle based on at least one of the first signal or the second signal.

14. The non-transitory machine readable storage medium of claim 13, wherein the instructions cause the processor circuitry to:
determine whether the steering angle matches a target steering angle associated with a position of a steering wheel; and
when the steering angle is different from the target steering angle, control an output of a motor to adjust the steering angle based on a difference between the steering angle and the target steering angle.

15. A method comprising:
determining a load encountered by a steering rack of a vehicle based on (i) a first signal corresponding to a position of a motor shaft and (ii) a second signal corresponding to a rotation of a pinion separate from the motor shaft.

16. The method of claim 15, further including controlling a torque on a steering wheel based on the load.

17. The method of claim 15, further including:
determining a first position of the steering rack based on the first signal;
determining a second position of the steering rack based on the second signal;
when the first position is different from the second position, determining the steering rack has a non-zero load; and
when the first position matches the second position, determining the load is zero.

18. The method of claim 17, further including, when the first position is different from the second position, determining a value of the non-zero load based on a difference between the first position and the second position.

19. The method of claim 18, further including, when the first position is different from the second position, determining the value of the non-zero load based on a spring rate of a spring that resists linear movement of a geared thrust bearing engaged with the motor shaft and the pinion.

20. The method of claim 15, further including:
determining a steering angle implemented by wheels of the vehicle based on at least one of the first signal or the second signal;
determining whether the steering angle matches a target steering angle associated with a position of a steering wheel; and
when the steering angle is different from the target steering angle, adjusting an output of a motor to cause an adjustment to the steering angle based on a difference between the steering angle and the target steering angle.

* * * * *

UNITED STATES PATENT AND TRADEMARK OFFICE
CERTIFICATE OF CORRECTION

Page 1 of 1

PATENT NO. : 12,179,856 B2
APPLICATION NO. : 18/518144
DATED : December 31, 2024
INVENTOR(S) : Washnock It is certified that error appears in the above-identified patent and that said Letters Patent is hereby corrected as shown below:

In the Claims

Column 20, Claim 1, Line 55, Delete "or execute"

Signed and Sealed this
Eighteenth Day of March, 2025

Coke Morgan Stewart
*Acting Director of the United States Patent and Trademark Office*